US012339253B2

United States Patent
Ueno et al.

(10) Patent No.: US 12,339,253 B2
(45) Date of Patent: Jun. 24, 2025

(54) CORROSION DETERMINATION SYSTEM, CORROSION DETERMINATION APPARATUS AND CORROSION DETERMINATION METHOD

(71) Applicant: Kabushiki Kaisha Toshiba, Tokyo (JP)

(72) Inventors: Keisuke Ueno, Kawasaki (JP); Takashi Usui, Saitama (JP); Kazuo Watabe, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 468 days.

(21) Appl. No.: 17/653,501

(22) Filed: Mar. 4, 2022

(65) Prior Publication Data

US 2023/0078350 A1 Mar. 16, 2023

(30) Foreign Application Priority Data

Sep. 14, 2021 (JP) ................................. 2021-149219

(51) Int. Cl.
*G01N 29/14* (2006.01)

(52) U.S. Cl.
CPC .................................... *G01N 29/14* (2013.01)

(58) Field of Classification Search
CPC ......... G01N 29/14; G01N 2291/02845; G01N 29/043; G01N 29/069; G01N 29/07; G01N 29/4427; G01N 2291/0258
See application file for complete search history.

(56) References Cited

U.S. PATENT DOCUMENTS 3,946,600 A * 3/1976 Rettig ..................... G01H 1/00
73/590
4,609,994 A * 9/1986 Bassim .................. G01N 29/14
73/40.5 A (Continued)

FOREIGN PATENT DOCUMENTS

CN 108956767 A * 12/2018 ........... G01N 29/048
CN 110672154 A * 1/2020 ............. G01D 21/02

(Continued)

OTHER PUBLICATIONS

Cho et al. "Monitoring Corrosion Under Insulations by Acoustic Emission and Humidity Measurement", J. Nondestruct. Eval. vol. 30, pp. 59-63 (Year: 2011).*

(Continued)

*Primary Examiner* — Natalie Huls
(74) *Attorney, Agent, or Firm* — Oblon, McClelland, Maier & Neustadt, L.L.P.

(57) ABSTRACT

According to one embodiment, a corrosion determination system according to an embodiment includes one or more sensors, an index data acquirer, and a corrosion determiner. Elastic waves generated from a structure including at least a member that generates elastic waves due to corrosion are detected. The index data acquirer acquires index data that is an index of an amount of water on the surface of the structure. The corrosion determiner determines whether there is corrosion in the structure based on elastic waves generated due to corrosion identified based on the index data among a plurality of elastic waves detected by the one or more sensors.

6 Claims, 8 Drawing Sheets

(56) References Cited

U.S. PATENT DOCUMENTS

| | | | | |
|---|---|---|---|---|
| 5,526,689 | A * | 6/1996 | Coulter | G01N 29/11 |
| | | | | 73/592 |
| 10,352,912 | B2 * | 7/2019 | Iida | G01N 29/4427 |
| 2012/0330570 | A1 * | 12/2012 | Hedl | G01N 29/245 |
| | | | | 702/39 |
| 2018/0253957 | A1 * | 9/2018 | Jhangiani | G08B 21/20 |

FOREIGN PATENT DOCUMENTS

| | | | |
|---|---|---|---|
| JP | 2005351884 A * | 12/2005 | |
| JP | 2013-205287 A | 10/2013 | |
| JP | 2018-165725 A | 10/2018 | |
| RU | 54660 U1 * | 7/2006 | |

OTHER PUBLICATIONS

Cho et al., "AE Behavior for Corrosion on Carbon Steel in High Humidity Environments", Bull. Soc. Sea Water Sci., Jpn., 68, 2014, 13 pages (with English Machine Translation).

Nishikata et al., "Monitoring of Corrosion Rate of Carbon Steel under Wet/Dry Cycle Conditions and Its Corrosion Mechanism", Zairyo-to-Kankyo, 43, 1994, 13 pages (with English Machine Translation).

* cited by examiner

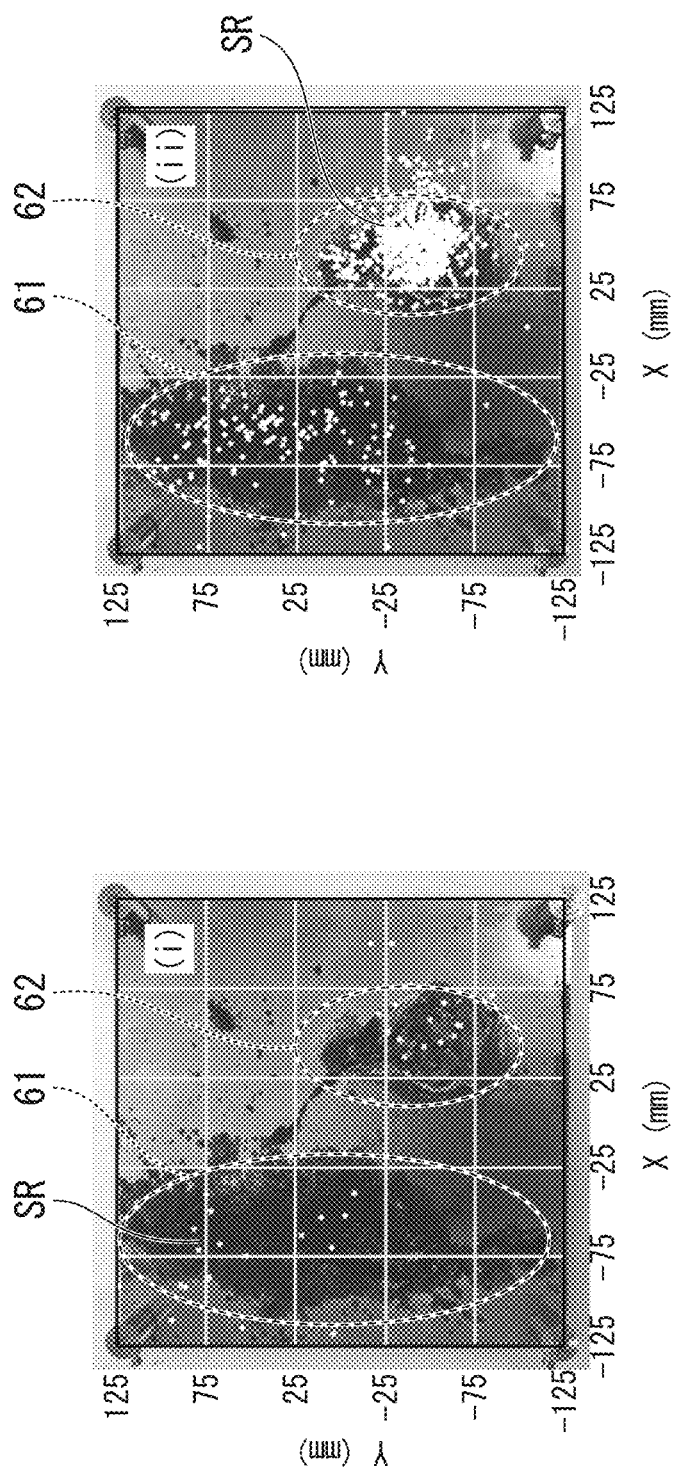

CORROSION DETERMINATION SYSTEM, CORROSION DETERMINATION APPARATUS AND CORROSION DETERMINATION METHOD

CROSS-REFERENCE TO RELATED APPLICATION

This application is based upon and claims the benefit of priority from Japanese Patent Application No. 2021-149219, filed Sep. 14, 2021; the entire contents of which are incorporated herein by reference.

FIELD

Embodiments described herein relate generally to a corrosion determination system, a corrosion determination apparatus and a corrosion determination method.

BACKGROUND

There is an acoustic emission (AE) method as a method of monitoring for the occurrence of corrosion (occurrence of rust) in a steel structure. The AE method is a method of detecting, with a sensor, elastic waves generated from a cracked breakdown portion of a corroded product due to the progress of corrosion. In the AE method, it is possible to determine whether there is corrosion in the vicinity of a sensor, and it is possible to estimate a position of an elastic wave generation source (hereinafter referred to as an "elastic wave source"). That is, the elastic wave source is at a position at which corrosion has occurred. There have been attempts to apply corrosion detection by the AE method to the bottoms of oil storage tanks, plant pipes under a coating material such as a heat insulating material, buried underground pipes, and the like, which are particularly difficult to check directly and visually.

In an actual outdoor environment, since elastic waves generated by changes in the volume of structures due to a change in temperature, disturbances due to rainfall and the like, vibrations caused by movement of fluids in pipes and plants, and the like are mixed in as noise, it may be difficult to distinguish elastic waves caused by corrosion.

BRIEF DESCRIPTION OF THE DRAWINGS

FIG. 9A shows the results obtained by determining the elastic wave source using the elastic waves acquired in the time period (i).

FIG. 9B shows the results obtained by determining the elastic wave source using the elastic waves acquired in the time period (ii).

DETAILED DESCRIPTION

Figure 1:
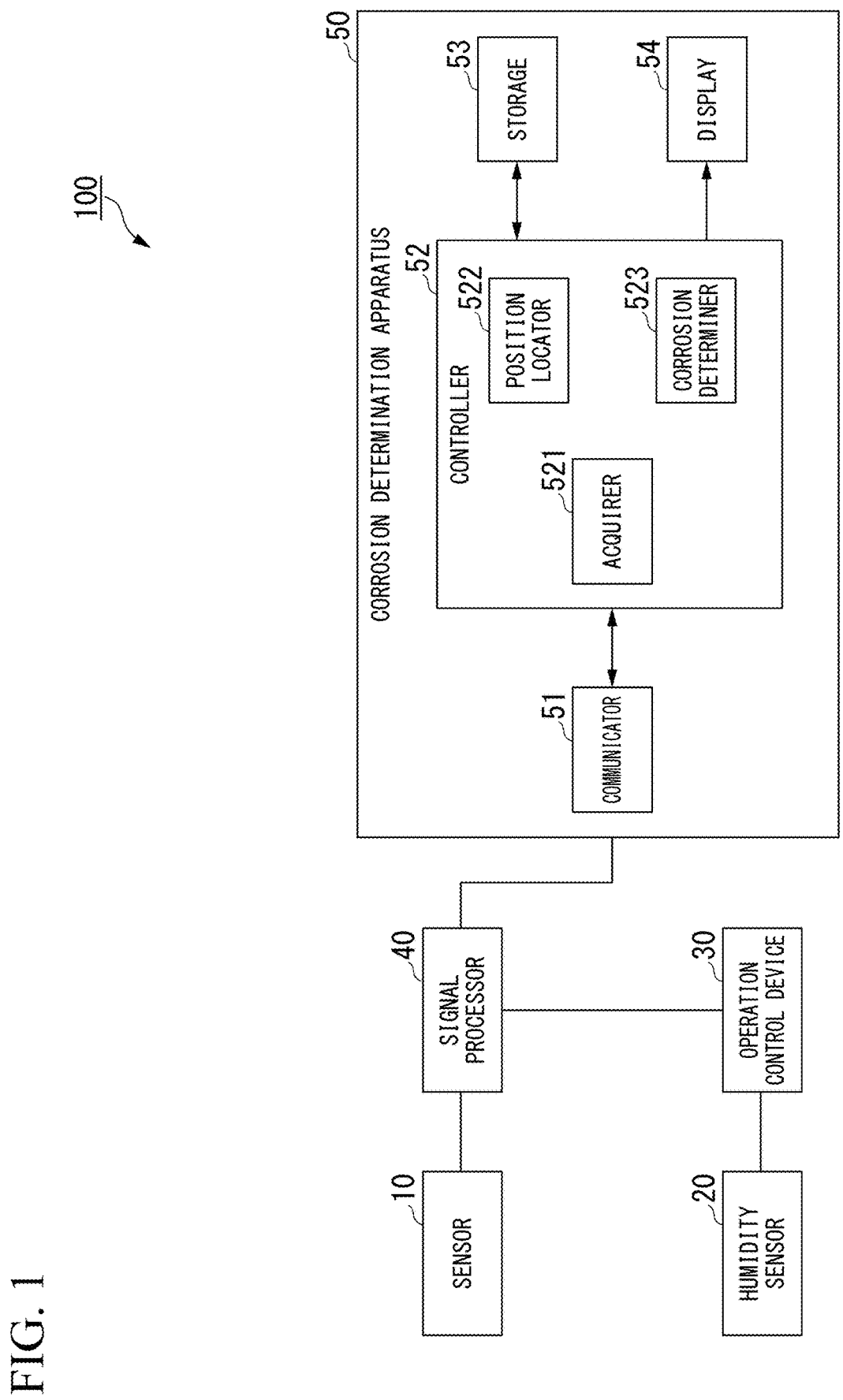
FIG. 1 is a diagram showing a configuration of a corrosion determination system according to an embodiment.

The present invention provides a problem to be solved by the present invention is to provide a corrosion determination system, a corrosion determination apparatus and a corrosion determination method through which it is possible to reduce an influence of noise and it is possible to determine corrosion of a steel structure.

According to one embodiment, a corrosion determination system according to an embodiment includes one or more sensors, an index data acquirer, and a corrosion determiner. Elastic waves generated from a structure including at least a member that generates elastic waves due to corrosion are detected. The index data acquirer acquires index data that is an index of an amount of water on the surface of the structure. The corrosion determiner determines whether there is corrosion in the structure based on elastic waves generated due to corrosion identified based on the index data among a plurality of elastic waves detected by the one or more sensors.

Hereinafter, a corrosion determination system, a corrosion determination apparatus and a corrosion determination method according to embodiments will be described with reference to the drawings.

(Overview)

Conventionally, it is known that an atmospheric corrosion rate depends on the amount of water (water film thickness) present on the metal surface. Particularly, it has been confirmed by an electrochemical evaluation method that a corrosion reaction becomes active in a drying procedure in which an amount of water on the surface decreases sharply (for example, refer to Reference 1). This indicates that elastic waves caused by corrosion can be detected in a short time by measuring elastic waves only in the drying procedure. Therefore, in the corrosion determination system according to the embodiment, it is possible to determine whether there is corrosion in a steel structure using elastic waves caused by corrosion.

(Reference 1: "Monitoring of Corrosion Rate of Carbon Steel under Wet/Dry Cycle Conditions and Its Corrosion Mechanism," Materials and Environment 43, 188-193 (1994))

More specifically, in the corrosion determination system according to the embodiment, in an environment in which corrosion determination is performed, based on data that is an index of the amount of water on the surface in the steel structure (hereinafter referred to as "index data"), which is data obtained by a humidity sensor or a moisture meter installed in a steel structure, elastic waves caused by corrosion are acquired. The index data is, for example, relative humidity.

In the corrosion determination system, for example, elastic waves caused by corrosion are acquired by starting measurement of elastic waves in a time period in which elastic waves caused by corrosion can be detected based on the index data. In this manner, in the drying procedure, when measurement of elastic waves starts, it is possible to reduce the influence of noise and determine corrosion of the steel structure. Hereinafter, a specific configuration will be described.

FIG. 1 is a diagram showing a configuration of a corrosion determination system 100 according to an embodiment. The corrosion determination system 100 is used for determining corrosion generated in a steel structure. The steel structure is a structure including at least a member that generates elastic waves due to corrosion. The steel structure includes, for example, the bottoms of oil storage tanks, plant pipes under a coating material such as a heat insulating material, buried underground pipes, steel buildings, steel towers, steel structure bridges, and steel structure steel bridges (steel highway bridges and steel railway bridges). The member that generates elastic waves due to corrosion is, for example, iron such as steel.

The corrosion determination system 100 includes one or more sensors 10-1 to 10-$n$ (n is an integer of 1 or more), a humidity sensor 20, an operation control device 30, a signal processor 40 and a corrosion determination apparatus 50. The plurality of sensors 10-1 to 10-$n$ and the signal processor 40 are connected in a wired manner. The signal processor 40 and the corrosion determination apparatus 50 are connected in a wired or wireless manner. The humidity sensor 20 and the operation control device 30 are connected in a wired manner. The operation control device 30 and the signal processor 40 are connected in a wired manner. Here, in the following description, when the sensors 10-1 to 10-$n$ are not distinguished, they will be described as the sensor 10.

The sensor 10 has a piezoelectric element and detects elastic waves generated from the steel structure. For example, the sensor 10 detects elastic waves generated due to corrosion (for example, rusting) generated in at least a steel structure. The sensor 10 is installed in the steel structure. The sensor 10 converts the detected elastic waves into an electrical signal. The sensor 10 outputs the electrical signal to the signal processor 40.

For the sensor 10, for example, a piezoelectric element having sensitivity in a range of 10 kHz to 1 MHz is used. One example of the sensor 10 is a type such as a resonance type having a resonant peak within a frequency range or a wideband type in which resonance is minimized, but the sensor 10 may be of any type. Methods of detecting elastic waves by the sensor 10 include methods using a voltage output type, a resistance change type, a capacitance type and the like, and any detection method may be used. Here, an acceleration sensor may be used in place of the sensor 10. In this case, the acceleration sensor detects elastic waves generated from the inside of the steel structure. Then, the acceleration sensor converts the detected elastic waves into a voltage signal by performing the same processing as in the sensor 10.

The humidity sensor 20 measures index data in an environment in which the steel structure is installed. For example, the humidity sensor 20 measures a relative humidity in an environment. The humidity sensor 20 outputs index data, which is a measurement result, to the operation control device 30. Here, a moisture meter may be used in place of the humidity sensor 20. In this case, the moisture meter is installed in the vicinity of the steel structure and measures the index data.

The operation control device 30 controls the signal processor 40 based on the index data output from the humidity sensor 20. The operation control device 30 determines whether an activation condition for activating the signal processor 40 is satisfied based on at least any of a value of a relative humidity indicated by index data and a rate of change in relative humidity, and activates the signal processor 40 when the activation condition is satisfied. For example, when the activation condition is satisfied, the operation control device 30 outputs the operation signal for putting the signal processor 40 into the operation state to the signal processor 40. When the signal processor 40 is put into an operation state, signal processing can be performed on the signal processor 40. That is, the signal processor 40 does not perform signal processing on the elastic waves until the operation signal is acquired from the operation control device 30.

The activation condition is, for example, that the relative humidity changes from a first threshold value or more to a second threshold value or less. Here, the activation condition may be that, for example, the relative humidity changes from the first threshold value or more to the second threshold value or less, and the time required for the relative humidity to change from the first threshold value or more to the second threshold value or less may be within a predetermined period. The first threshold value is a preset humidity value that is considered to be a wet environment, for example, 90%. The second threshold value is a preset humidity value that is considered to be a dry environment, for example, 50%.

Here, the first threshold value and the second threshold value are not limited to the above values. As shown in Reference 1, since the corrosion reaction becomes active in the drying procedure in which the amount of water on the surface of the steel structure decreases sharply, when the environment of a place in which the humidity sensor 20 is installed changes from a wet environment to a dry environment, elastic waves caused by corrosion are generated. Therefore, the operation control device 30 may activate the signal processor 40 at a timing when the relative humidity changes from the first threshold value or more to the second threshold value or less, and thus a larger amount of elastic waves caused by corrosion can be measured.

The signal processor 40 transitions to the operation state based on the operation signal output from the operation control device 30. The signal processor 40 is in a stop state until it transitions to the operation state. The stop state is a state in which the operation is stopped. The stop state is a state in which power consumption is reduced compared with in the operation state. The stop state may be, for example, a state in which no signal processing is performed even if the unit is activated, a sleep state, or a pause state in which power is turned off.

When the state transitions to the operation state, the signal processor 40 performs signal processing on the electrical signal of the elastic waves output from the sensor 10. The signal processing performed by the signal processor 40 is, for example, noise removal or parameter extraction. The signal processor 40 generates transmission data including a digital signal after signal processing and outputs the generated transmission data to the corrosion determination apparatus 50. The signal processor 40 is formed using an analog circuit or a digital circuit. The digital circuit is realized by, for example, a field programmable gate array (FPGA) or a microcomputer. The digital circuit may be realized by a dedicated large-scale integration (LST). In addition, in the signal processor 40, a non-volatile memory such as a flash memory or a removable memory may be mounted.

The corrosion determination apparatus 50 determines whether there is corrosion in the steel structure based on the transmission data obtained from the signal processor 40. Here, the determination of whether there is corrosion in the steel structure performed by the corrosion determination apparatus 50 includes determination of a region in which corrosion has occurred, estimation of the thickness of rust, and the like.

Figure 2:
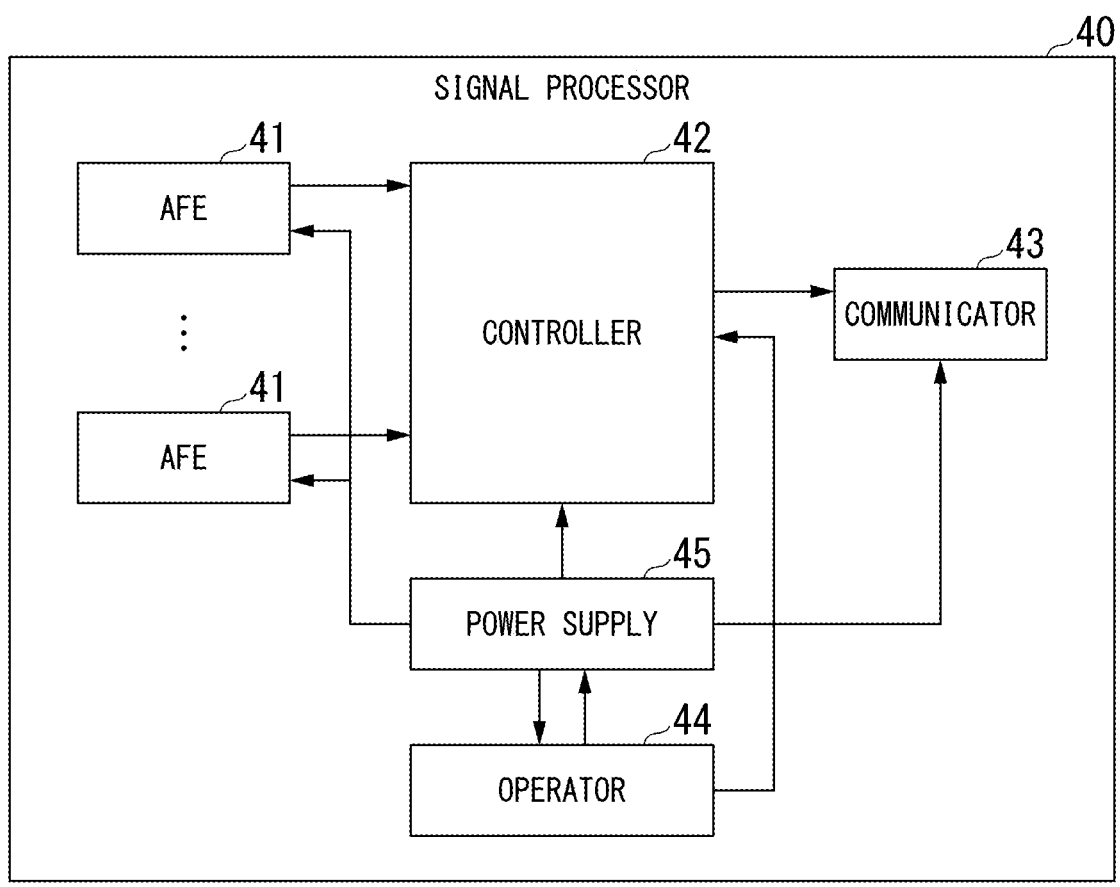
FIG. 2 is a schematic block diagram showing functions of a signal processor according to an embodiment.

FIG. 2 is a schematic block diagram showing functions of the signal processor 40 according to an embodiment. The signal processor 40 includes a plurality of analog front ends (AFE) 41, a controller 42, a communicator 43, an operator 44 and a power supplier 45.

The AFE 41 performs filter processing and analog-to-digital conversion processing on the electrical signal output from the sensor 10. The AFE 41 outputs the signal after filter processing and analog-to-digital conversion processing to the controller 42.

The controller 42 controls the entire signal processor 40. The controller 42 is formed using a processor such as a CPU and a memory. For example, the controller 42 generates transmission data based on the signal after filter processing and analog-to-digital conversion processing, which is output from the AFE 41.

The communicator 43 transmits the transmission data generated by the controller 42 to the corrosion determination apparatus 50.

When the operation signal is acquired from the operation control device 30, the operator 44 puts the controller 42 and the power supplier 45 into the operation state. For example, when the controller 42 is in the sleep state, the operator 44 is put into the operation state so that signal processing is possible in the controller 42. For example, when the controller 42 is in the pause state, the operator 44 puts the controller 42 into the operation state by supplying power from the power supplier 45 to the controller 42. Here, similarly, when either the AFE 41 or the communicator 43 is not powered on, the operator 44 instructs the power supplier 45 to supply power to the functional unit that is not powered on and power supply is performed.

The power supplier 45 supplies power to each functional unit according to an instruction of the operator 44. Specifically, the power supplier 45 supplies power to the AFE 41, the controller 42, the communicator 43 and the operator 44. The power supplier 45 is a unit that receives power supplied from an external power supply, a primary battery, a secondary battery, a solar cell, an energy harvester or the like, and supplies power to each functional unit from here according to an instruction of the operator 44.

Figure 3:
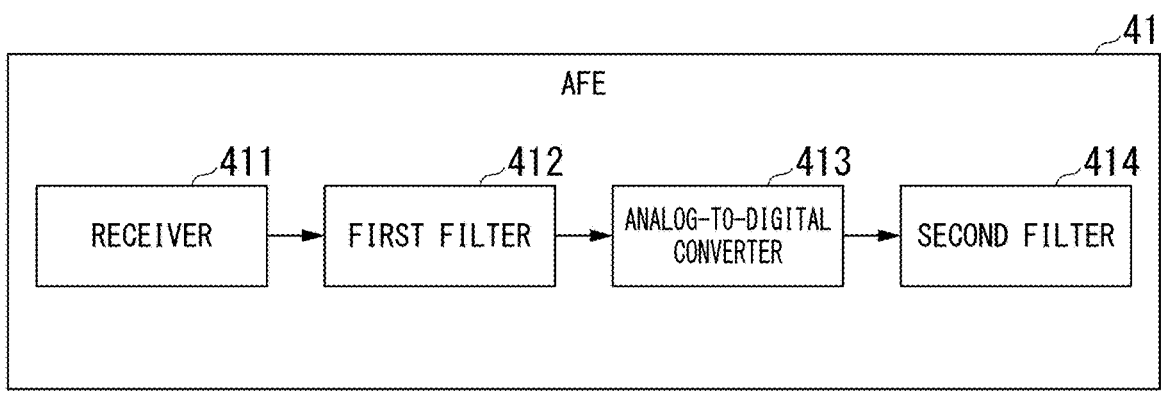
FIG. 3 is a schematic block diagram showing functions of an AFE according to an embodiment.

FIG. 3 is a schematic block diagram showing functions of the AFE 41 according to an embodiment. The AFE 41 includes a receiver 411, a first filter 412, an analog-to-digital converter 413 and a second filter 414.

The receiver 411 receives the electrical signal transmitted from the sensor 10. The receiver 411 outputs the received electrical signal to the first filter 412. It is assumed that time information detected by the sensor 10 is attached to the electrical signal.

The first filter 412 removes noise from the electrical signal received by the receiver 411. For example, the first filter 412 removes a frequency band other than a specific frequency band as noise from the electrical signal. The first filter 412 is, for example, a bandpass filter. The first filter 412 outputs an analog signal after noise removal (hereinafter referred to as a "noise-removed analog signal") to the analog-to-digital converter 413.

The analog-to-digital converter 413 converts an analog signal into a digital signal by quantizing the noise-removed analog signal output from the first filter 412. The analog-to-digital converter 413 outputs the digital signal to the second filter 414.

The second filter 414 removes noise from the digital signal output from the analog-to-digital converter 413. The second filter 414 is a filter for removing noise. The second filter 414 outputs the digital signal after noise removal (hereinafter referred to as a "noise-removed digital signal") to the controller 42.

In the following description, the processing performed in the AFE 41 will be referred to as preprocessing.

Figure 4:
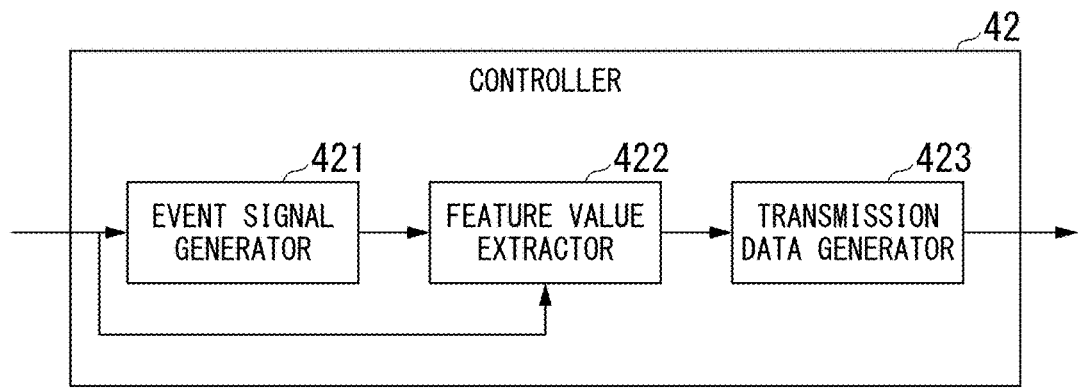
FIG. 4 is a schematic block diagram showing functions of a controller according to an embodiment.

FIG. 4 is a schematic block diagram showing functions of the controller 42 according to an embodiment. When a program is executed, the controller 42 functions as an event signal generator 421, a feature point extractor 422 and a transmission data generator 423. The program for realizing the event signal generator 421, the feature point extractor 422 and the transmission data generator 423 may be installed in the signal processor 40 at the time of shipping or may be installed separately.

The event signal generator 421 inputs the noise-removed digital signal output from the second filter 414. The event signal generator 421 generates a gate signal indicating whether the waveform of the input noise-removed digital signal has been maintained. The event signal generator 421 is realized by, for example, an envelope detector and a comparator. The envelope detector detects the envelope of the noise-removed digital signal. The envelope is extracted, for example, by squaring the noise-removed digital signal and performing predetermined processing (for example, processing using a low-pass filter or Hilbert transform) on the squared output value. The comparator determines whether the envelope of the noise-removed digital signal is a predetermined threshold value or more.

When the envelope of the noise-removed digital signal is a predetermined threshold value or more, the event signal generator 421 outputs a first gate signal indicating that the waveform of the noise-removed digital signal is maintained to the feature point extractor 422. When the first gate signal is output, it indicates that an event has occurred. On the other hand, when the envelope of the noise-removed digital signal is less than a predetermined threshold value, the event signal generator 421 outputs a second gate signal indicating that the waveform of the noise-removed digital signal is not maintained to the feature point extractor 422. When the second gate signal is output, it indicates that the event has ended. ChangeFinder, Akaike's Information Criterion (AIC) or the like may be used for detection of the occurrence of an event, that is, determination of whether the envelope is a predetermined threshold value or more.

The feature point extractor 422 inputs the gate signal output from the event signal generator 421 and the noise-removed digital signal output from the second filter 414. The feature point extractor 422 extracts feature points when the waveform of the signal is continuous from the noise-removed digital signal based on the input gate signal and the noise-removed digital signal. The feature points are parameters, for example, a waveform amplitude [mV] of the noise-removed digital signal, a rise time [usec] of the gate signal, a duration [usec] of the gate signal, a zero cross count number [times] of the noise-removed digital signal, a waveform energy [arb.] of the noise-removed digital signal and a frequency [Hz] of the noise-removed digital signal.

The amplitude of the noise-removed digital signal is, for example, a value of the maximum amplitude in the noise-removed digital signal. The rise time of the gate signal is, for example, a time from when the gate signal is a zero value until it rises beyond a preset predetermined value. The duration of the gate signal is, for example, a time from when the rise of the gate signal starts until the amplitude becomes smaller than the preset value. The zero cross count number of the noise-removed digital signal is, for example, the number of times that the noise-removed digital signal crosses a reference line that passes through the zero value. The waveform energy of the noise-removed digital signal is, for example, a value obtained by integrating the squared amplitudes at time points with time. Here, the definition of energy is not limited to the above example, and may be approximated, for example, using the envelope of the waveform.

The feature point extractor 422 outputs the extracted feature point to the transmission data generator 423. The feature point extractor 422 associates a sensor ID with the feature point when the feature point is output to the transmission data generator 423. The sensor ID represents identification information for identifying the sensor 10 installed in the steel structure. The feature point extractor 422 outputs the feature point associated with the sensor ID to the transmission data generator 423.

The transmission data generator 423 inputs the feature point associated with the sensor ID output from the feature point extractor 422. The transmission data generator 423 generates transmission data including the feature point associated with the input sensor ID. The transmission data generator 423 outputs the generated transmission data to the communicator 43.

Referring back to FIG. 1, the description will continue.

The corrosion determination apparatus 50 includes a communicator 51, a controller 52, a storage 53 and a display 54.

The communicator 51 receives the transmission data output from the signal processor 40.

The controller 52 controls the entire corrosion determination apparatus 50. The controller 52 is formed using a processor such as a central processing unit (CPU) and a memory. When a program is executed, the controller 52 functions as an acquirer 521, a position locator 522, and a corrosion determiner 523. The program for realizing the acquirer 521, the position locator 522, and the corrosion determiner 523 may be installed in the corrosion determination apparatus 50 at the time of shipping or may be installed separately.

The acquirer 521 acquires the transmission data output from the signal processor 40. For example, when the signal processor 40 and the corrosion determination apparatus 50 communicate wirelessly, the acquirer 521 functions as a communication interface and acquires transmission data by performing wireless communication with the signal processor 40. For example, when the signal processor 40 and the corrosion determination apparatus 50 communicate in a wired manner, the acquirer 521 functions as a communication interface and acquires transmission data by performing wired communication with the signal processor 40.

The position locator 522 performs position determination of the elastic wave source based on the sensor position information and the sensor ID) and the time information contained in the transmission data. The sensor position information includes information about an installation position of the sensor 10 associated with the sensor ID. The sensor position information includes, for example, information about the installation position of the sensor 10 such as the latitude and longitude or distances in a horizontal direction and a vertical direction from a reference position of the steel structure. The position locator 522 holds the sensor position information in advance. The sensor position information may be stored in the position locator 522 at any timing before the position locator 522 performs position determination of the elastic wave source.

The corrosion determiner 523 determines whether there is corrosion in the structure based on the result of position determination by the position locator 522. Position determination by the position locator 522 is performed using, for example, elastic waves generated due to corrosion identified based on the index data. In this manner, the corrosion determiner 523 performs determination of whether there is corrosion in the structure based on elastic waves generated due to corrosion identified based on the index data among a plurality of elastic waves detected by one or more sensors 10.

The storage 53 stores the transmission data acquired by the acquirer 521. The storage 53 is formed using a storage device such as a magnetic hard disk device or a semiconductor storage device.

The display 54 is an image display device such as a liquid crystal display and an organic electro luminescence (EL) display. The display 54 displays the determination results according to control of the controller 52. The display 54 may be an interface for connecting the image display device to the corrosion determination apparatus 50. In this case, the display 54 generates a video signal for displaying the determination result and outputs the video signal to the image display device connected to the display 54.

Figure 5:
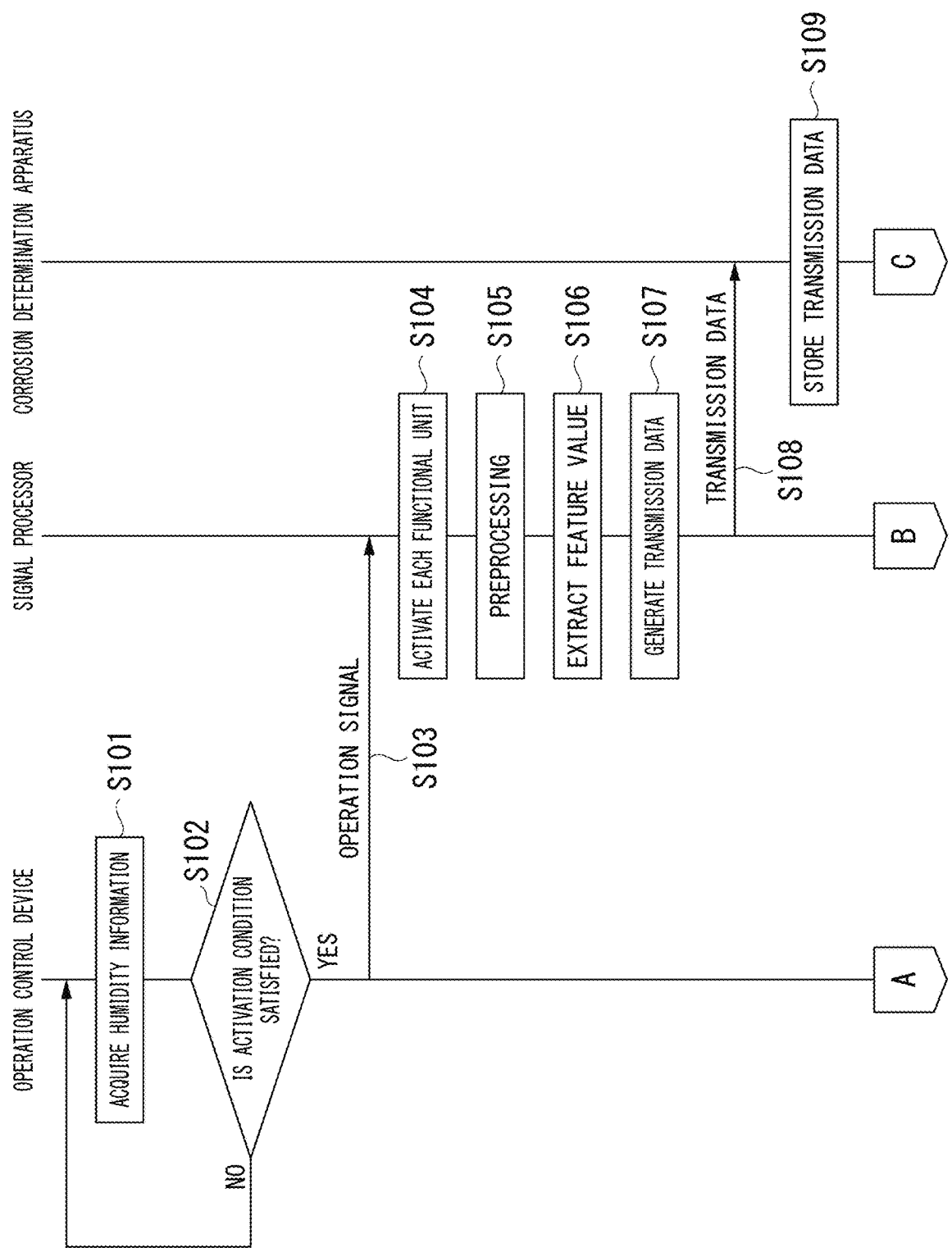
FIG. 5 is a sequence diagram showing a flow of a corrosion determination process performed by a corrosion determination system according to an embodiment.
Figure 6:
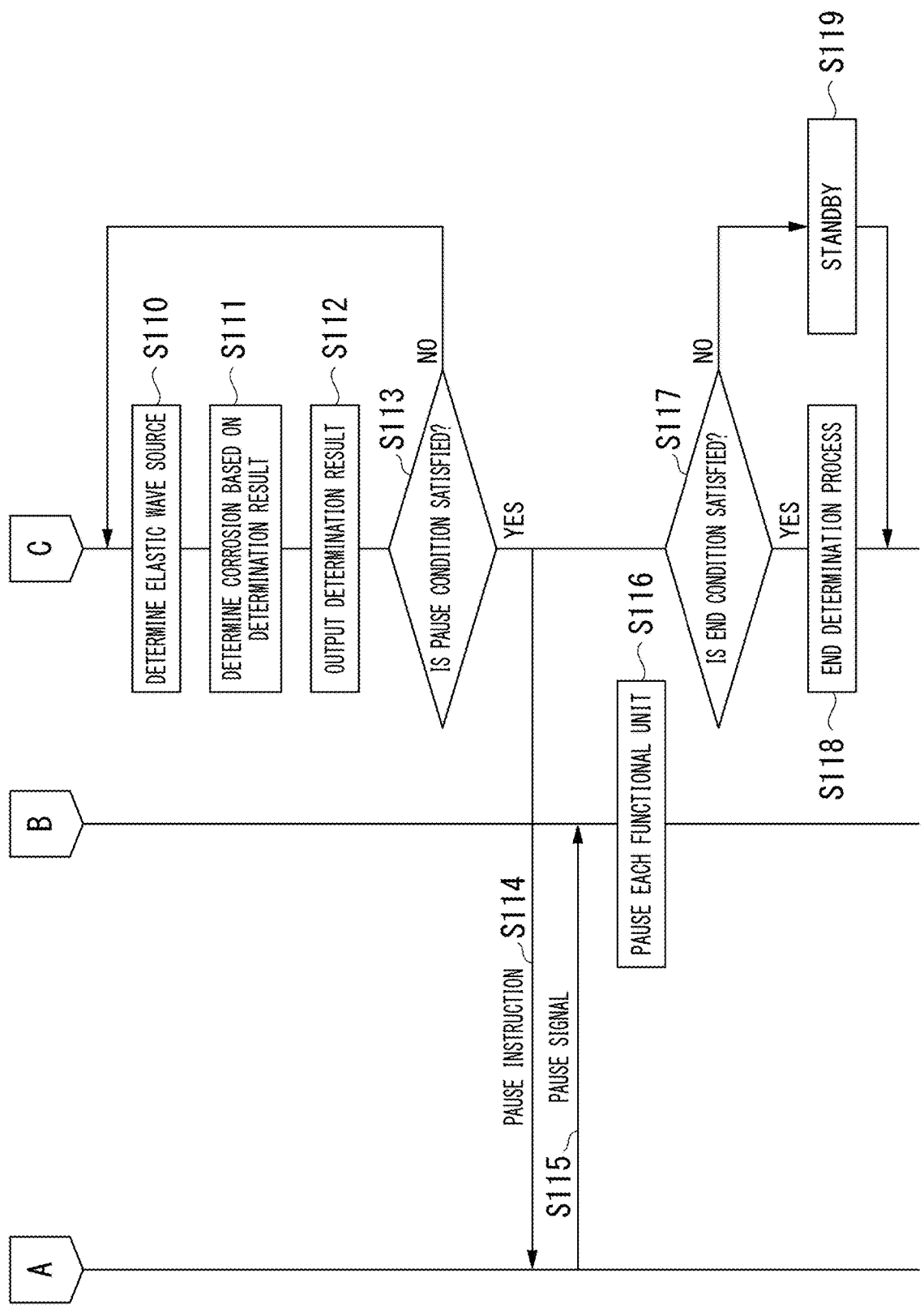
FIG. 6 is a sequence diagram showing a flow of a corrosion determination process performed by a corrosion determination system according to an embodiment.

FIGS. 5 and 6 are sequence diagrams showing a flow of a corrosion determination process performed by the corrosion determination system 100 according to the embodiment. A case in which the signal processor 40 is in a stop state when the process in FIGS. 5 and 6 starts will be exemplified.

The operation control device 30 acquires the humidity information measured by the humidity sensor 20 (index data) (Step S101). The operation control device 30 determines whether the activation condition is satisfied (Step S102). When the activation condition is not satisfied (Step S102—NO), the operation control device 30 repeatedly performs the process in Step S101.

When the activation condition is satisfied (Step S102—YES), the operation control device 30 generates an operation signal. The operation control device 30 outputs the generated operation signal to the signal processor 40 (Step S103).

When the operator 44 of the signal processor 40 acquires the operation signal from the operation control device 30, it instructs the power supplier 45 to supply power, and thus each functional unit is put into an operation state (Step S104). Thereby, the signal processor 40 can acquire the electrical signal output from the sensor 10.

The AFB 41 performs preprocessing on the electrical signal transmitted from the sensor 10 (Step S105). Specifically, the AFE 41 performs filter processing and analog-to-digital conversion processing on the electrical signal. The AFE 41 outputs the digital signal to the controller 42. The controller 42 uses the digital signal output from the AFE 41 as an input, and extracts a feature point from the digital signal (Step S106).

The feature point extractor 422 associates the extracted feature point with the sensor ID and outputs it to the transmission data generator 423. The transmission data generator 423 generates transmission data including the feature point output from the feature point extractor 422 (Step S107). The transmission data generator 423 outputs the generated transmission data to the communicator 43. The communicator 43 transmits the transmission data output from the transmission data generator 423 to the corrosion determination apparatus 50 (Step S108).

The communicator 51 receives the transmission data transmitted from the signal processor 40. The acquirer 521 stores the acquired transmission data in the storage 53 (Step S109). The position locator 522 determines the elastic wave source using a plurality of transmission data items stored in the storage 53 (Step S110). Specifically, first, the position locator 522 extracts transmission data in one event from the plurality of transmission data items stored in the storage 53. The event represents an elastic wave generation event that has occurred in the steel structure. The elastic wave generation event in the present embodiment is corrosion. When one event occurs, elastic waves are detected by a plurality of sensors 10 at substantially the same time. That is, in the storage 53, a plurality of transmission data items related to elastic waves detected at substantially the same time are stored. Therefore, the position locator 522 provides a predetermined time window and extracts all transmission data items whose arrival time is within a time window range as transmission data in one event.

The time window range Tw may be determined using the elastic wave propagation velocity v in the target steel structure and the maximum sensor interval dmax so that it is in a range of Tw≥dmax/v. In order to avoid erroneous detection, it is desirable to set Tw to as small a value as possible so that it can be substantially Tw=dmax/v. The elastic wave propagation velocity v may be obtained in advance.

Next, the position locator 522 determines the position of the elastic wave source based on the sensor ID and the time information included in the extracted transmission data in one event and the sensor position information held in advance. For example, the position locator 522 calculates a difference in times for elastic waves to arrive at the plurality of sensors 10. Next, the position locator 522 determines the position of the elastic wave source using the sensor position information and information about the difference in the arrival times. The position locator 522 determines the positions of a plurality of elastic wave sources by repeating this process a plurality of times.

The position locator 522 outputs the determination result to the corrosion determiner 523. The corrosion determiner 523 determines corrosion of the steel structure based on the determination result output from the position locator 522 (Step S111). Specifically, the corrosion determiner 523 determines a region in which the elastic wave source shown as the determination result has a threshold value or more as a region in which corrosion has occurred. The corrosion determiner 523 controls the display 54 to display the determination result (Step S112). Specifically, the corrosion determiner 523 may display information indicating the region in which corrosion has occurred on the image of the steel structure in an overlapping manner and display information indicating the position of the elastic wave source on the image of the steel structure in an overlapping manner. The display 54 displays the determination result according to control of the corrosion determiner 523.

In addition, the corrosion determiner 523 may estimate the thickness of rust. As the elastic wave source becomes denser, the rust becomes thicker. Therefore, the corrosion determiner 523 holds information indicating the thickness of rust according to the proportion of the elastic wave source in the set region and estimates the thickness of rust according to the proportion of the elastic wave source shown as the determination result.

The corrosion determiner 523 determines whether the pause condition is satisfied (Step S113). The pause condition is a condition for pausing the signal processor. The pause condition is, for example, that the number of elastic waves acquired per hour is less than a preset threshold value or an elastic wave acquisition rate per hour is less than a preset threshold value. When the pause condition is satisfied, the corrosion determiner 523 generates a pause instruction to instruct that the signal processor 40 to be put into the stop state. The corrosion determiner 523 transmits the pause instruction to the operation control device 30 through the communicator 51 (Step S114).

The operation control device 30 generates a pause signal for putting the signal processor 40 into a stop state in response to the reception of the pause instruction transmitted from the corrosion determination apparatus 50. The operation control device 30 outputs the generated pause signal to the signal processor 40 (Step S115).

When the pause signal is acquired from the operation control device 30, the operator 44 of the signal processor 40 instructs the power supplier 45 to pause power supply and puts each functional unit into a stop state (Step S116).

The corrosion determiner 523 determines whether the end condition is satisfied (Step S117). The end condition is a condition for terminating the corrosion determination process of the steel structure. The end condition is, for example, that the preset monitoring end time has arrived. When the end condition is satisfied (Step S113—YES), the corrosion determination apparatus 50 ends the corrosion determination processing.

On the other hand, when the end condition is not satisfied (Step S117—NO), the corrosion determination apparatus 50 stands by (Step S119). When the corrosion determination apparatus 50 is in the standby state, if transmission data is obtained from the signal processor 40, the corrosion determination apparatus 50 executes the process after Step S109.

Figure 7:
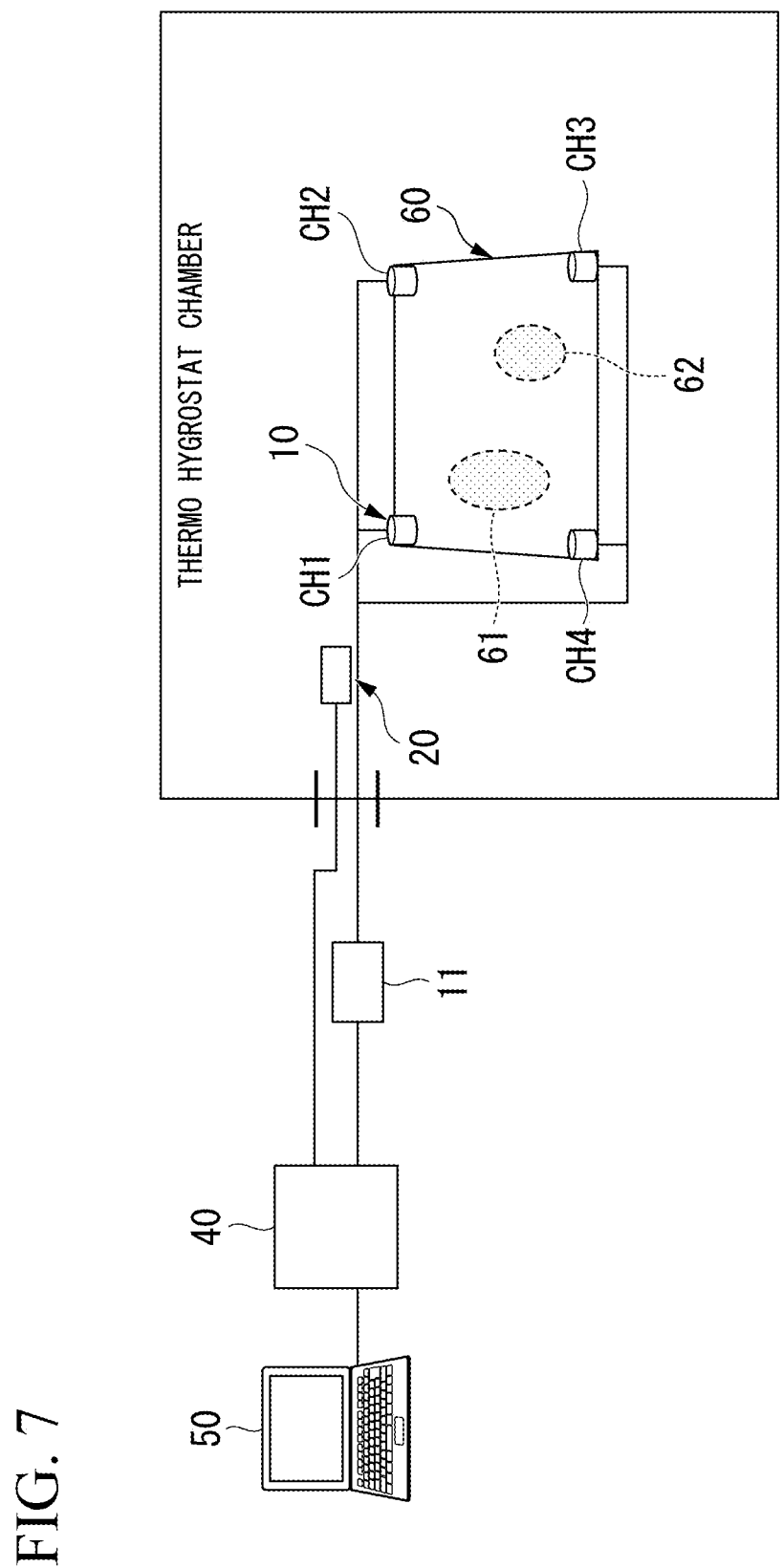
FIG. 7 is a diagram showing a configuration of a system used in an experiment.

An experiment for elastic waves caused by corrosion in a procedure of reducing the amount of water on the metal surface will be described with reference to FIG. 7 to FIG. 9. FIG. 7 is a diagram showing a configuration of a system used in the experiment. In the experiment, a steel plate 60 in which rusts 61 and 62 were generated in two places was installed in a thermo hygrostat chamber in advance, and control was performed so that the relative humidity was constant at 90% for 2 hours→constant speed drop to 50% for 30 minutes→constant at 50% for 2 hours. Four sensors 10 (CH1 to CH4 sensors) were disposed on the steel plate 60, and the humidity sensor 20 was disposed in the thermo hygrostat chamber. The sensor 10 was connected to the signal processor 40 with a cable through an amplifier 11, and the humidity sensor 20 was directly connected to the signal processor 40 with a cable, and measured elastic waves under humidity control.

Figure 8:
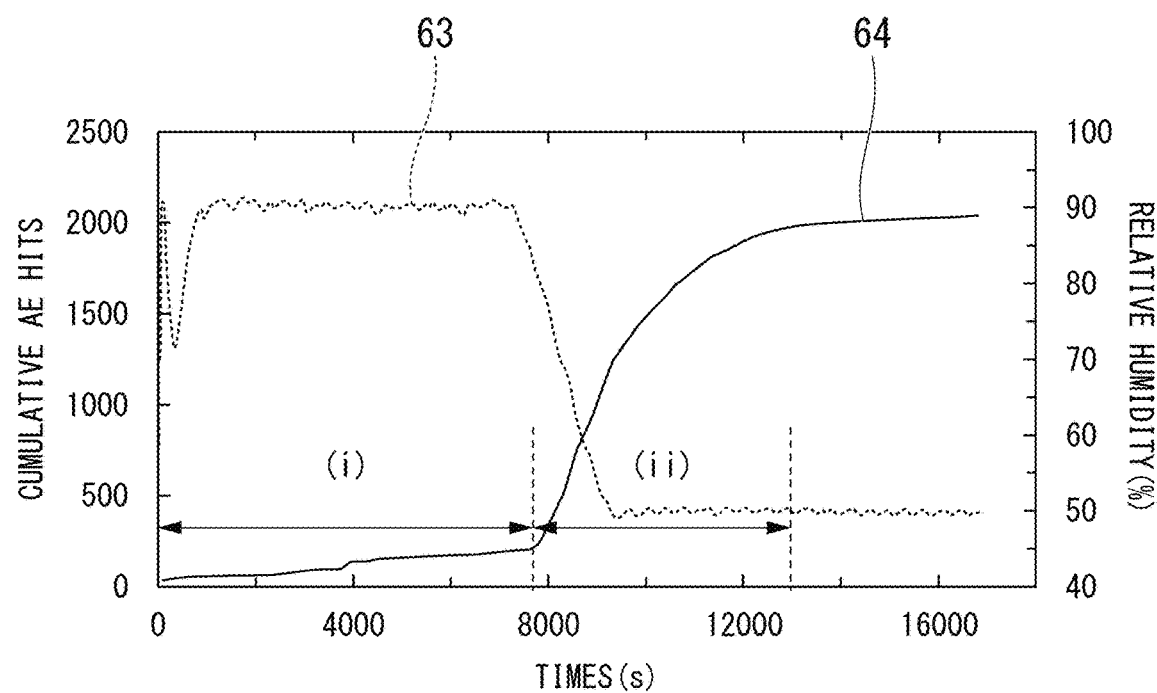
FIG. 8 is a diagram showing the relationship between a relative humidity and the number of elastic waves generated.

FIG. 8 is a diagram showing the relationship between the relative humidity and the number of elastic waves generated. In FIG. 8, the horizontal axis represents time (seconds), the left vertical axis represents the number of cumulative elastic waves generated, and the right vertical axis represents the relative humidity. The transition line 63 shown in FIG. 8 represents the transition of the relative humidity, and the transition line 64 represents the transition of the number of cumulative elastic waves generated. Compared to the time period (i) in which the humidity was constant, a larger number of elastic waves generated were observed in the time period (ii) during the humidity drop and after the humidity drop. FIG. 9 shows estimation results of the elastic wave source determined based on times for elastic waves to arrive at the sensors in the time periods (i) and (ii).

FIGS. 9A and 9B shows diagrams of the determination result of the elastic wave source in different time periods. FIG. 9A shows the results obtained by determining the elastic wave source using the elastic waves acquired in the time period (i), and FIG. 9B shows the results obtained by determining the elastic wave source using the elastic waves acquired in the time period (ii). In FIGS. 9A and 9B, a plurality of determination points SR indicating the positions of the elastic wave sources are shown. It is considered that the rust layer is present in a region in which the determination point SR is distributed, and the rust layer becomes thicker as the distribution of the determination point SR becomes denser. It can be understood that, there are not a sufficient number of determination points SR for determining corrosion in the time period (i), but a number of determination points SR with which the rust position and the thickness can be estimated are obtained in the time period (ii).

According to the corrosion determination system 100 configured as described above, it is possible to reduce the influence of noise and determine corrosion of the steel structure. Specifically, the corrosion determination system 100 determines whether there is corrosion in the steel structure based on elastic waves generated due to corrosion identified based on the index data among a plurality of elastic waves detected by one or more sensors 10. Thereby, the corrosion determination system 100 can perform determination using elastic waves generated due to corrosion excluding elastic waves that cause noise. Therefore, it is possible to reduce the influence of noise and determine corrosion of the steel structure.

The corrosion determination system 100 determines whether it is necessary to activate the signal processor 40 based on the index data. Thereby, the signal processor 40 may not necessarily be activated constantly. Therefore, it is possible to reduce power consumption.

The corrosion determination system 100 determines whether the activation condition for activating the signal processor 40 is satisfied based on at least any of the value of the relative humidity and the rate of change in the relative humidity, and activates the signal processor 40 when the activation condition is satisfied. Thereby, the corrosion determination system 100 can activate the signal processor 40 at a timing when the elastic waves generated due to corrosion can be measured. Therefore, it is possible to accurately acquire elastic waves required for determining corrosion of the steel structure. Therefore, it is possible to accurately determine corrosion of the steel structure.

Even if the signal processor 40 is activated under a condition in which elastic waves are rarely generated, power is wastefully consumed. Thus, the corrosion determination system 100 pauses the signal processor 40 when the number of elastic waves acquired per hour is less than a preset threshold value. Therefore, it is possible to reduce unnecessary power consumption.

The corrosion determination system 100 determines a position at which corrosion has occurred based on the plurality of elastic waves detected by the plurality of sensors 10. In addition, the corrosion determination system 100 determines a region in which the position at which corrosion has occurred has a threshold value or more as a region in which corrosion has occurred. Thereby, the part in which corrosion is occurring can be found. As a result, the user can easily find the part in which corrosion has occurred by visual inspection, and perform a replacement operation or the like.

Hereinafter, modified examples will be described.

Modified Example 1

A configuration using the index data measured by the humidity sensor 20 in the corrosion determination system 100 has been described in the above embodiment. In the corrosion determination system 100, prediction data of the relative humidity for each time obtained from the device that provides weather information may be used as index data.

With such a configuration, the corrosion determination system 100 may not include the humidity sensor 20 or the moisture meter. However, in order to improve accuracy, it is desirable to include the humidity sensor 20 or the moisture meter. The process performed by the corrosion determination system 100 using prediction data of the relative humidity for each time obtained from the device that provides weather information will be described.

The prediction data includes the value of the relative humidity for each time. Therefore, the operation control device 30 refers to the prediction data, searches for a time period in which the relative humidity sharply decreases (a time period in which the relative humidity changes from the first threshold value or more to the second threshold value or less), and determines a measurement start time t. The measurement start time t is a time at which the relative humidity sharply decreases. The operation control device 30 outputs an operation signal to the signal processor 40 at a timing when the measurement start time t arrives.

With such a configuration, the measurement start time can be determined in advance. Thereby, other devices in the corrosion determination system 100 may also be activated at a timing when measurement is performed. As a result, it is possible to reduce power consumption of the entire corrosion determination system 100.

Modified Example 2

A configuration in which the activation state and the stop state are switched in the signal processor 40 has been shown in the above embodiment, but the signal processor 40 may be activated constantly. With such a configuration, the humidity sensor 20 and the operation control device 30 may not be provided in the corrosion determination system 100.

When the signal processor 40 is activated constantly, the signal processor 40 transmits all the transmission data based on the elastic waves detected by the sensor 10 to the corrosion determination apparatus 50. That is, the corrosion determination apparatus 50 acquires transmission data based on the elastic waves that cause noise in addition to the elastic waves generated due to corrosion. Therefore, the corrosion determination apparatus 50 may have a configuration in which the prediction data of the relative humidity for each time obtained from the device that provides weather information is used as index data, and transmission data based on the elastic waves that cause noise is excluded. Specifically, the acquirer 521 acquires prediction data. The position locator 522 refers to the prediction data acquired by the acquirer 521 and searches for a time period in which the relative humidity sharply decreases (a time period in which the relative humidity changes from the first threshold value or more to the second threshold value or less). The position locator 522 determines the position of the elastic wave source using the transmission data acquired in the searched time period. Thereby, it is possible to exclude the transmission data based on the elastic waves that cause noise.

Modified Example 3

In the above example, an example in which the activation condition is that the relative humidity changes from the first threshold value or more to the second threshold value or less has been described, but the activation condition is not limited thereto. For example, the activation condition may be that the rate of change when the relative humidity changes from the first threshold value or more to the second threshold value or less within a predetermined period becomes a third threshold value or more. With such a configuration, the operation control device 30 calculates a rate of change when the relative humidity changes from the first threshold value or more to the second threshold value or less within a predetermined period. The operation control device 30 determines whether the calculated rate of change is the third threshold value or more. When the calculated rate of change is the third threshold value or more, the operation control device 30 activates the signal processor 40 at a timing when the rate of change becomes the third threshold value or more. When the rate of change is not the third threshold value or more, the operation control device 30 does not activate the signal processor 40.

According to at least one of the embodiments described above, when the corrosion determination system includes one or more sensors 10 that detect elastic waves generated from the steel structure, the index data acquirer that acquires index data (for example, the humidity sensor 20, the operation control device 30, the acquirer 521), and the corrosion determiner 523 that determines whether there is corrosion in the structure based on elastic waves generated due to corrosion identified based on the index data among a plurality of elastic waves detected by one or more sensors 10, it is possible to reduce the influence of noise and determine corrosion of the steel structure.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A corrosion determination system, comprising:
one or more sensors configured to detect elastic waves generated from a steel structure including a member that generates the elastic waves due to atmospheric corrosion;
an index data acquirer configured to acquire index data, which is an index of an amount of water on a surface of the steel structure;
a corrosion determiner configured to determine whether there is corrosion in the steel structure based on the detected elastic waves generated due to the atmospheric corrosion, identified based on the acquired index data, among a plurality of elastic waves detected by the one or more sensors;
a signal processor configured to perform signal processing on the detected elastic waves detected by the one or more sensors; and
a controller configured to control the signal processor, wherein the controller is configured to determine whether it is necessary to activate the signal processor based on the acquired index data,
wherein the acquired index data is data of relative humidity,
wherein the controller is further configured to determine whether an activation condition for activating the signal processor is satisfied based on at least any of a value of the relative humidity and a rate of change in the relative humidity, and activate the signal processor when the activation condition is satisfied,
wherein the activation condition is that a rate of change when the relative humidity changes from a first threshold value or more to a second threshold value or less within a predetermined period becomes a third threshold value or more, and
wherein the controller is further configured to activate the signal processor in response to determining that the rate of change becomes the third threshold value or more.

2. The corrosion determination system according to claim 1,
wherein the one or more sensors are a plurality of sensors, and
the corrosion determination system further comprises a position locator configured to determine a position at which the corrosion has occurred based on the elastic waves, which are detected by the plurality of sensors.

3. The corrosion determination system according to claim 2, wherein the corrosion determiner is further configured to determine a region in which the position at which the corrosion has occurred has a threshold value or more as a region in which the corrosion has occurred.

4. The corrosion determination system according to claim 1,
wherein the index data acquirer is a moisture meter or a humidity sensor, and
wherein the moisture meter or the humidity sensor acquires a measured value as the index data.

5. A corrosion determination system, comprising:
one or more sensors configured to detect elastic waves generated from a steel structure including a member that generates the elastic waves due to atmospheric corrosion;
an index data acquirer configured to acquire index data, which is an index of an amount of water on a surface of the steel structure;
a corrosion determiner configured to determine whether there is corrosion in the steel structure based on the detected elastic waves generated due to the atmospheric corrosion, identified based on the acquired index data, among a plurality of elastic waves detected by the one or more sensors;
a signal processor configured to perform signal processing on the detected elastic waves detected by the one or more sensors; and
a controller configured to control the signal processor, wherein the controller is configured to determine whether it is necessary to activate the signal processor based on the acquired index data,
wherein the controller is further configured to pause the signal processor when a number of the elastic waves detected per hour is less than a first preset threshold value or an elastic wave acquisition rate per hour is less than a second preset threshold value.

6. A corrosion determination system, comprising:
one or more sensors configured to detect elastic waves generated from a steel structure including a member that generates the elastic waves due to atmospheric corrosion;
an index data acquirer configured to acquire index data, which is an index of an amount of water on a surface of the steel structure;
a corrosion determiner configured to determine whether there is corrosion in the steel structure based on the detected elastic waves generated due to the atmospheric corrosion, identified based on the acquired index data, among a plurality of elastic waves detected by the one or more sensors, wherein the index data acquirer is further configured to acquire the index data from a device that provides weather information.

* * * * *